United States Patent [19]

Shiraishi

[11] Patent Number: 5,388,657

[45] Date of Patent: Feb. 14, 1995

[54] LIFTING MECHANISM FOR NO-MAN VEHICLE

[75] Inventor: Itsuo Shiraishi, Ebina, Japan

[73] Assignee: Yugen Kaisha Takuma Seiko, Kanagawa, Japan

[21] Appl. No.: 38,873

[22] Filed: Mar. 29, 1993

[51] Int. Cl.⁶ ............................................. B62D 1/24
[52] U.S. Cl. ................................. 180/168; 280/43.17; 280/43.23; 414/495; 414/498
[58] Field of Search .................. 280/43, 43.12, 43.17, 280/43.23; 180/168, 169; 414/495, 498; 254/2 R, 3 C, 3 B, 8 R, 8 B, 3 R, 2 B, 2 C

[56] References Cited

U.S. PATENT DOCUMENTS

| | | | |
|---|---|---|---|
| 4,515,235 | 5/1985 | Yamamoto et al. | 180/168 |
| 4,813,703 | 3/1987 | Fischer | 254/7 R |
| 4,925,357 | 5/1990 | Cisternino et al. | 414/495 |
| 5,033,928 | 7/1991 | Suominen | 414/495 |
| 5,201,819 | 4/1993 | Shiraishi et al. | 180/168 |

*Primary Examiner*—Richard M. Camby
*Attorney, Agent, or Firm*—Browdy and Neimark

[57] ABSTRACT

A lifting mechanism for a no-man vehicle self-propelled and run along a guide tape installed on a floor has a lifting motor secured to a base frame of the no-man vehicle, a cam disc driven by the lifting motor, and a lifting member 6 coming into contact with the cam disc and moving up-and-down when the cam disc rotates. There are on the circumference of the cam disc the first cam face 21 formed with a radius around the axis center point B of the rotary shaft passing through the cam disc and the second cam face 20 formed with a radius around the center point A different from the center point B.

4 Claims, 4 Drawing Sheets

LIFTING MECHANISM FOR NO-MAN VEHICLE

TECHNICAL FIELD OF THE INVENTION

The present invention relates to a lifting mechanism of a no-man vehicle adapted to raise and move vehicles, such as wagons and carts (herein after it is referred to wagon) having no drive means.

PRIOR ART

The specification of U.S. Pat. No. 4,515,235 discloses a no-man vehicle provided with a sensor for detecting a guide tape of optics or magnetics formed along a floor, an electric motor adapted to rotate when the sensor outputs a signal, and a set of driven wheels rotated by the electric motor. The conventional no-man vehicle is adapted to run without an operator along the guide tape with the load piled on a cargo board of the vehicle. Such vehicles have been used in works or factories in order to transfer industrial parts and the like.

Because such conventional no-man vehicles have the motor and driven wheels, respectively mounted on the cargo board, it is difficult to change the cargo board or its design after the vehicle is manufactured or bought for a particular purpose. For example, a cargo board designed to carry small parts such as electronics parts or elements is difficult to change its design to one for transferring large materials such as iron bars and the like.

In order to solve the problem of difficulty above, a lifting-type no-man vehicle has been proposed constructed so as to enter into a under space of the wagon having no drive means and then be raised elevating the wagon and driving the vehicle together with the wagon shouldered thereon.

According to the conventional lifting-type no-man vehicle, it must enter into the under space of the wagon, so the height of the vehicle is limited to about 15 to 20 cm. Apparently, it is difficult to design an efficient lifting mechanism of such height elevating horizontally the wagon having a considerably heavy weight without its inclination or slant of leftward or rightward and before or behind, and install the lifting mechanism on the lifting-type no-man vehicle.

PURPOSE OF THE INVENTION

Consequently, it is the purpose of the present invention to provide a lifting mechanism enabling to apply to a no-man vehicle of a height enabled to enter an under space of the ordinal wagon, to elevate the wagon having a considerable weight without its slanting of left and right, and before and behind, and to hold the wagon at such elevated position in a stable condition.

EMBODIMENTS

One embodiment of the lifting mechanism for the no-man or operatorless vehicle will be described with reference to the accompanying drawings.

Figure 1:
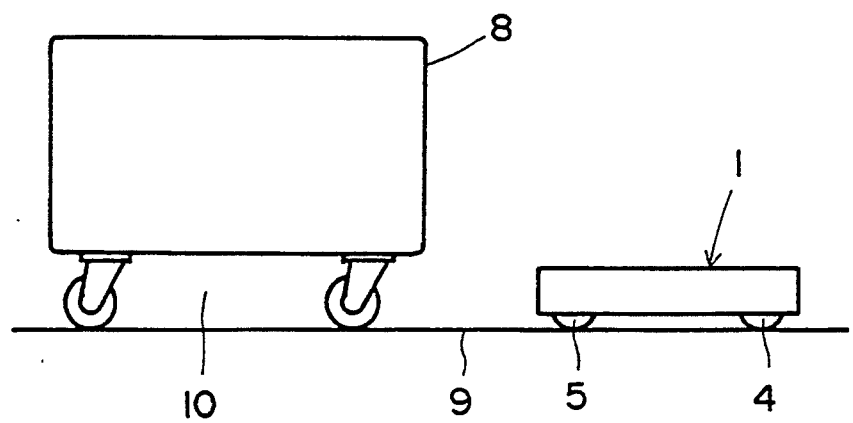
FIG. 1 is an illustrative view of an operative relation of the wagon and the no-man vehicle.
Figure 2:
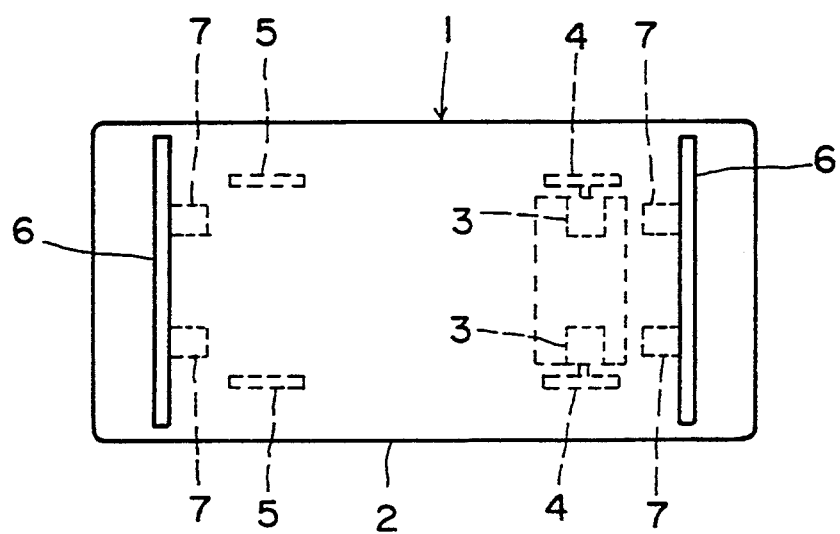
FIG. 2 is a plan view of the no-man vehicle having the lifting mechanism installed thereon.

The lifting no-man self-driven or self-propelled vehicle 1 according to the present invention has a size determined so as to make an entering of the vehicle 1 permit in a lower or under space 10 of the wagon 8 having no driving mechanism. As shown in FIG. 2, the base frame 2 of the self-propelled vehicle 1 has a plan shape of square. The base frame 2 has a pair of drive wheels 4 driven through a running electric motor 3, and another pair of non-drive wheels or driven wheels 5, respectively placed on the lower or bottom portion of the base frame 2. The numbers of the wheels 4 and 5 are determined at will according to the particular purpose of usage of the self-propelled vehicle 1. A pair of lifting members 6 is provided on the front end and rear end of the base frame 2 and they move in an up-and-down direction relative to the base frame 2 by rotation of the lifting motor 7. The lifting mechanisms for moving vertically the lifting member 6 are four in total, and they are divided into two sets of two lifting mechanisms, respectively arranged at the left and right sides of the lifting member 6.

Figure 3:
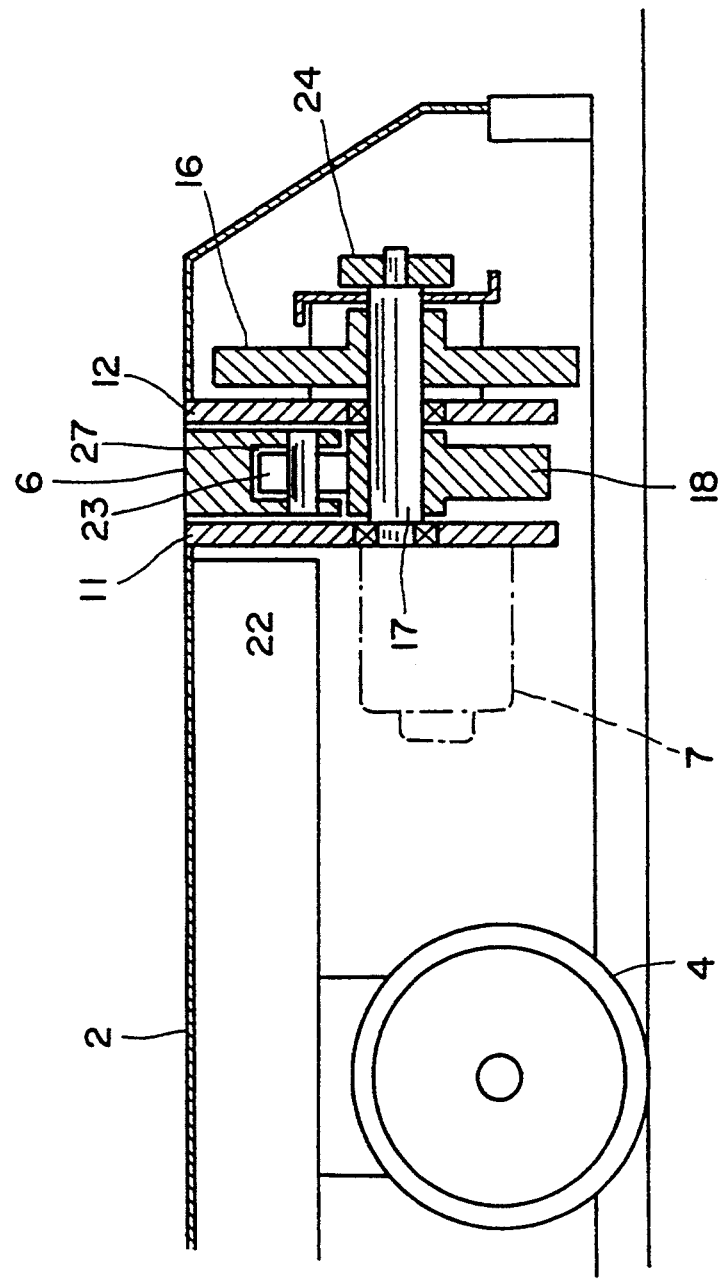
FIG. 3 is a longitudinal section showing the lifting mechanism mounted in the no-man vehicle.
Figure 4:
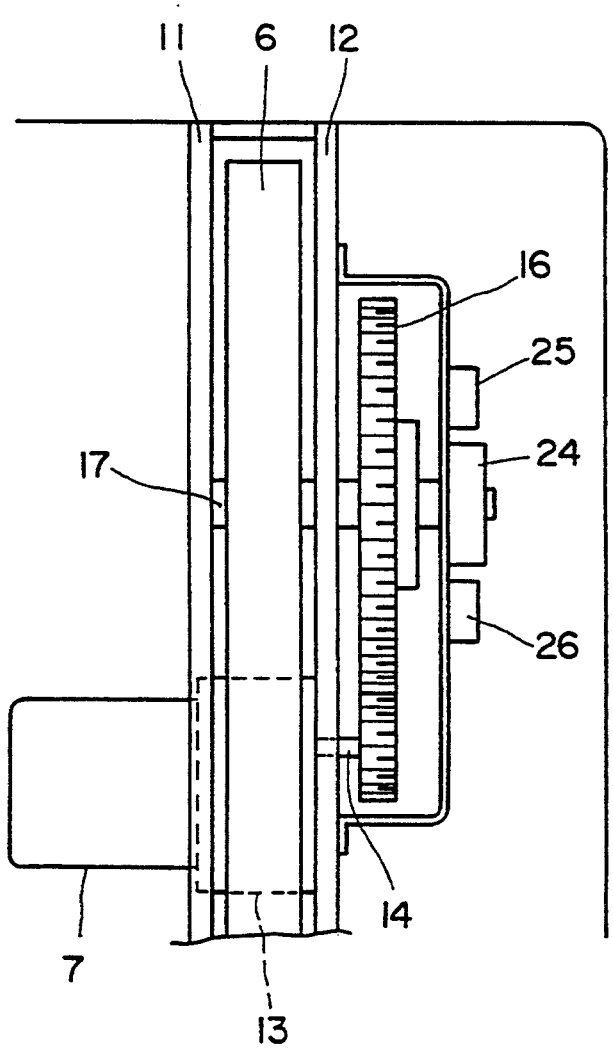
FIG. 4 is an enlarged view of the lifting mechanism.

As shown in FIG. 3 and FIG. 4, a lifting member 6 is arranged between a pair of frames 11 and 12, each secured to the base frame 2 with a predetermined distance. The lifting motor 7 and a speed-reduction gear box 13 are secured to the frames 11 and 12. A pinion 15 is secured to an output shaft 14 of the speed-reduction gear box 13. A large gear 16 engages with the pinion 15. One end of the rotary shaft 17 of the large gear 16 is rotatably supported on the frames 11 and 12.

Figure 5:
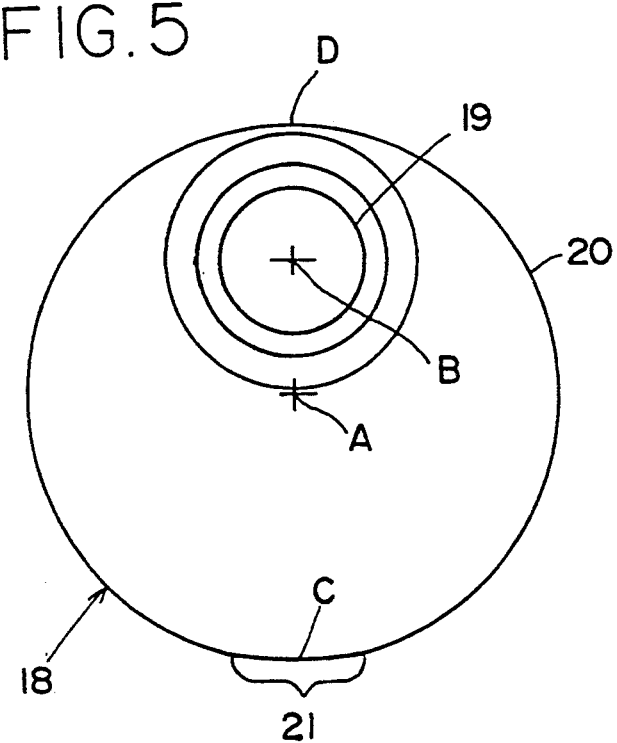
FIG. 5 is a front view of a cam disc.
Figure 6:
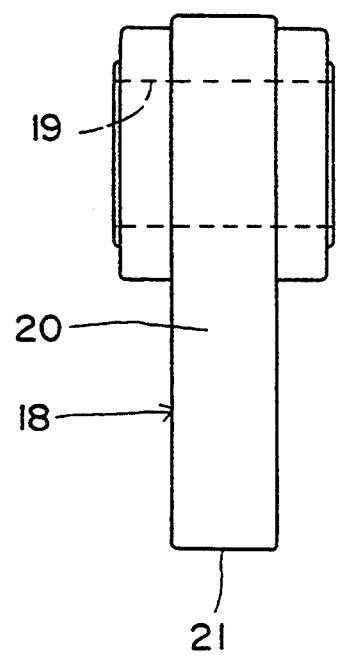
FIG. 6 is a side elevation of the cam disc.

A cam disc 18 is secured to the rotary shaft 17 so as to be placed between the frames 11 and 12. As shown in FIG. 5, a front view of the cam disc 18 is shaped in about a circle. A center point B of the shaft hole 19 through which the rotary shaft 17 passes is offset from a center point A of the cam disc 18. A circumference of the cam disc 18 is shown by a line 20 which is a part of a correct circle around the center point A except a part of the circumference around a point C which is furthest from the center point B. The part of the circumference furthest from the center point B coincides with a correct circle around the center point B.

Accordingly, when the cam disc 18 is rotated through the rotary shaft 17, the part 20 of the cam circumference continuously changes in its radius and the part 21 of the cam circumference doesn't change in its radius. When a distance from the center point A to the cam circumference part 20 is about 40 mm, a length of the cam circumference part 21 is sufficient if it is about 20 mm. A point D is closest to the center B of rotation.

Figure 7:
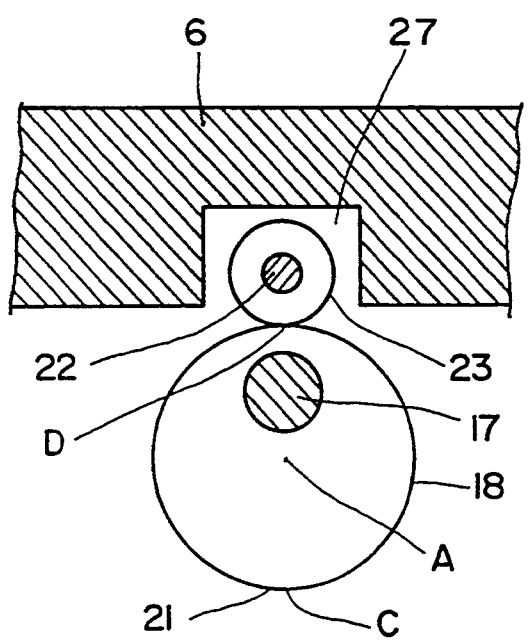
FIG. 7 is a partly-sectioned view depicting a contacting relation of the cam disc and a roller.

As shown in FIG. 3 and FIG. 7, dent portions 27 are formed on the bottom sides of the left and right of the lifting member 6. A roller 23 is rotatably journalled in the dent portion 27 through a shaft 22. An outer periphery or circumference of the cam disc 18 comes in contact with a bottom face of the roller 23.

A rotation body 24 is secured to another extended portion of the rotary shaft 17. A set of limit switches 25 and 26 are arranged about the outer side of the rotation body 24. The lifting motor 7 rotates when a switch (not shown) is turned on. When the rotary shaft 17 rotates by 180 degree, the limit switches 25 and 26 detect such situation making the lifting motor turn off.

OPERATION

When the lifting member 6 is down as shown in FIG. 3, the heights of the base frame 2 and the lifting member 6 are coincided with each other. In this condition of downing of the lifting member 6, the roller 23 comes in contact with the point D of the cam disc 18. If the cam disc 18 stops its rotation while the roller 23 fails to contact with the point D, the point D is placed at a point nearest to the rotation center point B. Consequently, when the lifting motor 7 turns off and the cam disc 18 begins a free-rotatable condition, and the cam disc 18 rotates automatically due to the weight of the lifting member 6 and resultantly the point D of the cam disc 18 is apt to come into contact with the roller 23. When the roller 23 is coincided with the point D of the cam disc 18, the cam disc 18 stops.

When the lifting self-propelled vehicle 1 progresses in the lower space 10 of the wagon 8 or in practice the wagon 8 is moved over the lifting self-propelled vehicle 1 and the switch of the lifting motor 7 is turned on, power of the lifting motor 7 is reduced by the speed-reduction gear box 13, the pinion 15, and the large gear 16 and as a result the rotary shaft 17 rotates at a considerably-reduced speed. Then, the cam disc 18 secured to the rotary shaft 17 rotates and the cam circumference part or cam face 20 pushes the roller 23.

When the rotary shaft 17 rotates by 180 degree, the rotary body 24 functions the limit switch 25 or 26 turning the lifting motor 7 off. At this time, the roller 23 comes in contact with the point C of the cam disc 18 opposing to its point D.

In practice, according to the conventional lifting mechanism, it has been difficult to make the roller 23 completely coincide with the point C due to production error and wrong positioning of these limit switches. In comparison, in the present invention, both sides of the point C on the circumference of the cam disc 18 are parts of the cam face 21 having the same radius around the point B, thereby the roller 23 securely coming into contact with the cam face 21 after the motor 7 is turned off. As a result, the heights lifted by respective lifting mechanisms placed at four positions on the lifting self-propelled vehicle 1 are made identical to each other, resulting in even lifting distances of the four lifting mechanisms and horizontal elevating of the wagon 8.

In addition, even the load of the wagon 8 is applied to the lifting member 6 after the limit switches function making the lifting motor 7 turn to off and the cam disc 18 becomes its free-rotationable condition, the load fails to function as a rotating force for the cam disc 18 because the lifting members 6 or rollers 23 are kept in their condition of being contacted with the cam faces 21 having the same radius of the rotation center point B. Consequently, the wagon 8 is held at its elevated or lifted posture.

According to the particular embodiment above of the present invention, the four lifting mechanisms of the no-man self-propelled vehicle respectively have four lifting motors 7 each installed on each lifting mechanism. However, it is possible to install a single lifting motor 7 for the four lifting mechanisms. Also, the cam face 20 of the circumference of the cam disc 18 has an arc shape having a radius of the point A according to the embodiment above. However, any shapes other than an arc can be employed to the cam face 20 of the cam disc 18 so far as that a cam face 20 of other shape can raise the roller 23 while the rotary shaft 17 rotates.

What is claimed is:

1. A lifting mechanism of a no-man vehicle adapted to run itself along a guide tape installed on a floor, comprising;
   a lifting motor secured to a base frame of said no-man vehicle,
   a cam disc rotated by said lifting motor,
   a lifting member in contact with said cam disc, said lifting member being raised or lowered when the cam disc is rotated by said lifting motor,
   wherein a portion of an outer circumference face of said cam disc includes a point closest to an axis of a shaft which rotates the cam disc, and another portion of the outer circumference face of the cam disc opposite to said closest point has a cam face of a predetermined length defining an arc having a constant radius measured from said axis said radius being longer than the distance between said point closest to said axis and said axis.

2. The lifting mechanism of the no-man vehicle according to claim 1, wherein said lifting member has a roller rotatably engaged to said cam disc.

3. The lifting mechanism of the no-man vehicle according to claim 1, further comprising a switch for stopping said lifting motor when a 180 degree rotation of the cam disc is detected.

4. A no-man vehicle adapted to run itself along a guide tape installed on a floor, comprising;
   a plurality of wheels attached to a lower face of a base frame,
   a running motor for rotating at least one of said wheels,
   a pair of lifting members attached so as to move vertically on said base frame, said lifting member separated by a predetermined distance from each other,
   cam discs respectively contacting opposite ends of each lifting member, and
   at least one lifting motor on said base frame for rotating each of said cam discs,
   wherein the outer circumference of each of said cam discs respectively has a first cam face portion having a first radius measured from a center of each of said cam discs and a second cam face portion having a second radius measured from a center of a rotary shaft rotating each of said cam discs.

* * * * *